US006684253B1

(12) United States Patent
Whitaker et al.

(10) Patent No.: US 6,684,253 B1
(45) Date of Patent: Jan. 27, 2004

(54) SECURE SEGREGATION OF DATA OF TWO OR MORE DOMAINS OR TRUST REALMS TRANSMITTED THROUGH A COMMON DATA CHANNEL

(75) Inventors: David James Whitaker, Albuquerque, NM (US); Jonathan Paul Anspach, Albuquerque, NM (US)

(73) Assignee: Wachovia Bank, N.A., As Administrative Agent, Charlotte, NC (US)

( * ) Notice: Subject to any disclaimer, the term of this patent is extended or adjusted under 35 U.S.C. 154(b) by 0 days.

(21) Appl. No.: 09/443,159

(22) Filed: Nov. 18, 1999

(51) Int. Cl.[7] .............................. G06F 15/16; G06F 9/00
(52) U.S. Cl. ....................................... 709/229; 713/201
(58) Field of Search ................................. 713/201, 200; 370/238.1; 709/229; 707/101

(56) References Cited

U.S. PATENT DOCUMENTS

| 4,621,188 | A | | 11/1986 | Stockburger et al. ........ 235/382 |
| 4,677,604 | A | | 6/1987 | Selby, III et al. ............. 369/33 |
| 4,891,504 | A | | 1/1990 | Gupta ......................... 235/462 |
| 5,204,961 | A | | 4/1993 | Barlow ........................ 395/725 |
| 5,208,853 | A | | 5/1993 | Armbruster et al. ........... 380/4 |
| 5,239,648 | A | | 8/1993 | Nukui .......................... 395/600 |
| 5,483,596 | A | | 1/1996 | Rosenow et al. ............. 380/25 |
| 5,544,322 | A | | 8/1996 | Cheng et al. ................ 395/200 |
| 5,706,266 | A | | 1/1998 | Brownstein et al. ........... 369/58 |
| 5,757,924 | A | | 5/1998 | Friedman et al. ............. 380/49 |
| 5,805,820 | A | | 9/1998 | Bellovin et al. ............. 395/200 |
| 5,813,010 | A | | 9/1998 | Kurano et al. ............... 707/100 |
| 5,828,832 | A | | 10/1998 | Holden et al. ............... 395/187 |
| 5,918,018 | A | | 6/1999 | Gooderum et al. .......... 395/200 |
| 5,930,239 | A | | 7/1999 | Turcotte ...................... 370/310 |
| 5,940,591 | A | | 8/1999 | Boyle et al. ................. 395/187 |
| 5,968,176 | A | * | 10/1999 | Nessett et al. ............... 713/201 |
| 6,330,610 | B1 | * | 12/2001 | Docter et al. ................ 709/229 |
| 6,421,321 | B1 | * | 7/2002 | Sakagawa et al. ........ 370/238.1 |
| 6,473,763 | B1 | * | 10/2002 | Corl, Jr. et al. ............. 707/101 |
| 6,487,664 | B1 | * | 11/2002 | Kellum ........................ 713/200 |

* cited by examiner

Primary Examiner—Zarni Maung
Assistant Examiner—Jungwon Chang

(57) ABSTRACT

A system for transporting data comprising a first domain comprising a first plurality of filters in a first communication channel, the first communications channel including a common portion, the first plurality of filters employing a first plurality of filtering criteria; a second domain comprising a second plurality of filters in a second communications channel, the second communications channel including the common portion, the second plurality of filters employing a second plurality of filtering criteria; a plurality of managers each coupled to one of the first plurality of filters and the second plurality of filters, each of the plurality of managers comprising means for configuring the one of the first plurality of filters and the second plurality of filters; and at least one control terminal coupled to the plurality of managers for controlling said plurality of managers.

10 Claims, 7 Drawing Sheets

Independent Filters Between Security Domains

SECURE SEGREGATION OF DATA OF TWO OR MORE DOMAINS OR TRUST REALMS TRANSMITTED THROUGH A COMMON DATA CHANNEL

BACKGROUND OF THE INVENTION

The present invention relates to segregation of data transmitted through a channel, and more particularly to segregation of data of two or more domains or trust realms transmitted through a common data channel. Even more particularly, the present invention relates to secure segregation of data of two or more domains or trust realms transmitted through a common data channel, without encryption.

Maintaining security within a distributed computer system or network has historically been a problem. Security in such systems has several aspects, including: (1) authentication of the identities of users and systems involved in a communication, (2) secure transmission of information, and (3) requiring the system and user, which receive secure communications, to follow predefined protocols so as to preserve the confidentiality of the transmitted information. Of these, the second is the focus of the attention of the present invention, and particularly the segregation or separation of information transmitted through a common data channel into at least two separate domains or trust realms.

In many military computer systems, security is ensured by verifying that all the computer hardware, including communications lines used to interconnect computers, is physically secure. As a result, physical security of the communications channels between components of such systems is generally considered secure. However, data traveling through such systems, even though physically secure, is to be distributed only to those users belonging to particular domains or trust realms. Transmission of data between trust realms is undesirable and represents a breach of security.

Both military and commercial computer systems use the concept of "levels" of security. A number of distinct security levels (domains or trust realms) are needed in many systems because some information is more confidential than other information, and each set of confidential information has an associated set of authorized recipients. Each set of confidential information must therefore be kept separate from other sets of confidential information.

Secure communications require that the computer operating system and network support segregation of information traveling from one user's terminal to other user terminals in a particular domain.

The present invention helps to provide secure communications between systems by providing a mechanism for ensuring that communications occur within "domains" or "trust realms" of systems, and by authenticating the systems, which are participating in a communication as members of particular domains or trust realms.

The present invention advantageously addresses the above and other needs.

SUMMARY OF THE INVENTION

The present invention advantageously addresses the needs above, as well as other needs by providing an approach for segregation of data transmitted through a channel, and more particularly to segregation of data of two or more domains or trust realms transmitted through a common data channel.

In one embodiment, the invention can be characterized as a system for segregating data. The system employs a common channel carrying data of a plurality of domains; a first switch through which data enters the common channel; a second switch through which data exits the channel; a first filter for filtering data traveling between the first switch and the second switch based on a first filtering criteria; a first set of routers coupled to the first switch, each router being for a respective one of the plurality of domains; a second filter for filtering data traveling through each of the first set of routers based on a second filtering criteria, the second filtering criteria being different from the first filtering criteria; a second set of routers coupled to the second switch, each router being for a respective one of the plurality of domains; a third filter for filtering data traveling through each of the second set of routers based on a third filtering criteria, the third filtering criteria being different from the first filtering criteria; a first terminal coupled to one of the first set of routers and being of a first of the plurality of domains; a second terminal coupled to one of the second set of routers and being of the first of the plurality of domains, wherein data transmitted by the first terminal passes through the one of the first set of routers to the first switch, through the first switch to the common channel, through the common channel to the second switch, through the second switch to the one of the second set of routers, and through the one of the second set of routers to the second terminal; a third terminal coupled to another of the first set of routers and being of a second of the plurality of domains; and a fourth terminal coupled to another of the second set of routers and being of a second of the plurality of domains, wherein data transmitted by the third terminal passes through the other of the first set of routers to the first switch, through the first switch to the common channel, through the common channel to the second switch, through the second switch to the other of the second set of routers, and through the other of the second set of routers to the fourth terminal, the first filter, the second filter and the third filter preventing data transmitted by the first terminal from reaching the third terminal and the fourth terminal.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE PREFERRED EMBODIMENTS

The following description of the presently contemplated best mode of practicing the invention is not to be taken in a limiting sense, but is made merely for the purpose of describing the general principles of the invention. The scope of the invention should be determined with reference to the claims.

Figure 1:
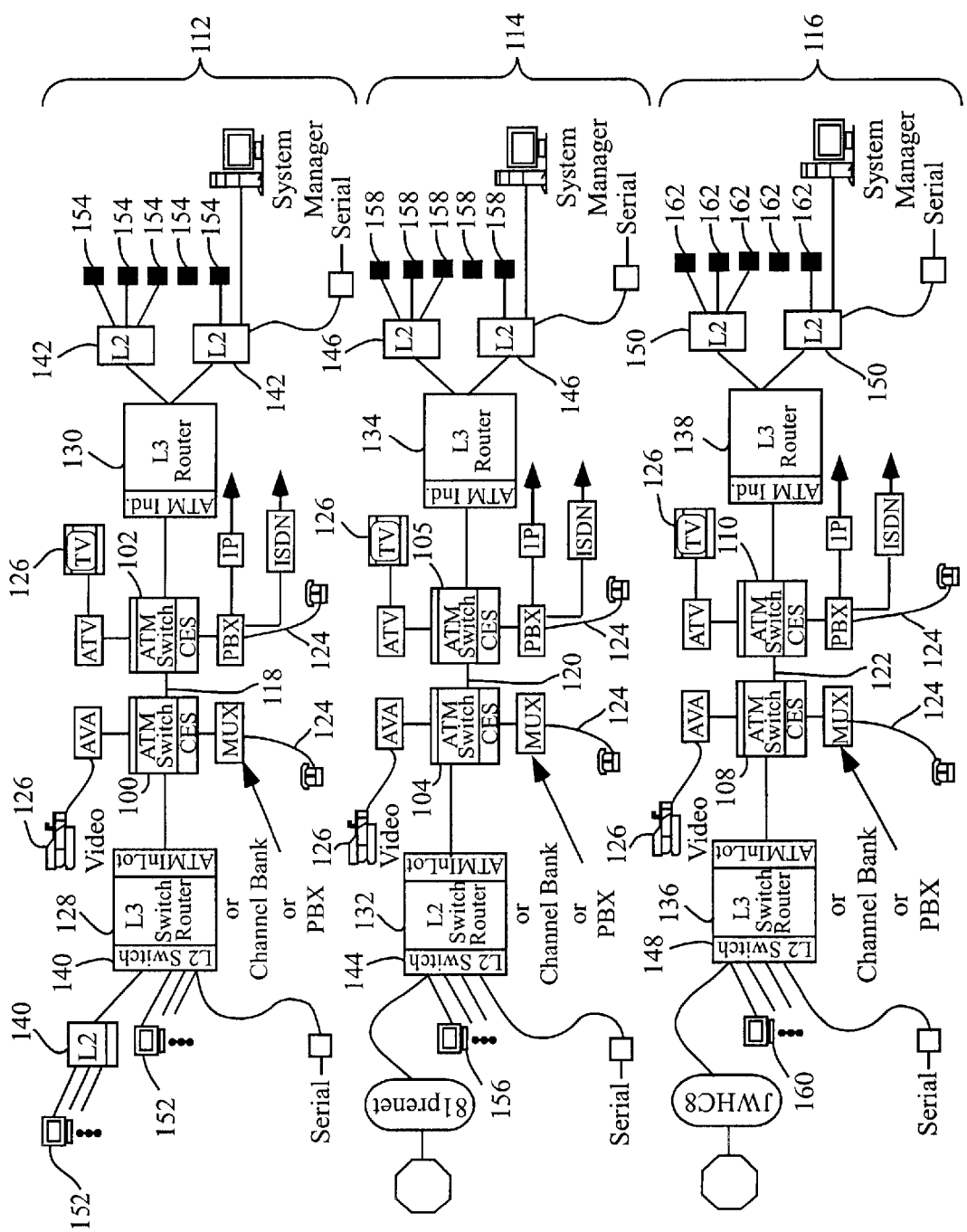
FIG. 1 is a block diagram illustrating a traditional "separate networks" approach to segregating or separating data into three domains or trust realms within a particular network installation.

Referring first to FIG. 1, a block diagram is shown illustrating a traditional "separate networks" approach to segregating or separating data into three domains or trust realms within a particular network installation. As shown, three pairs of asynchronous transfer modem (ATM) switches 100, 102, 104, 106, 108, 110 are illustrated, each being dedicated to one of three domains or trust realms 112, 114, 116, and thereby physically separating the data of each domain or trust realm 112, 114, 116 on physically separate channels 118, 120, 122. For example, a first pair of ATM switches 100, 102 could be dedicated to carrying "classified" information, a second pair 104, 106 "secret" information, and the third pair 108, 110 "top secret" information. Also shown are voice and video processors 124, 126 for each of the domains or trust realms 112, 114, 116.

Each of the ATM switches 128, 130, 132, 134, 136, 138 is also coupled to a respective layer three router 128, 130, 132, 134, 136, 138, each of which is in turn coupled to a respective Ethernet switch 140, 142, 144, 146, 148, 150 (or layer two switch), each of which is in turn coupled through a network interface card (NIC) to a respective terminal 152, 154, 156, 158, 160, 162, e.g., personal computer.

As can be seen, complete duplication of both switches and routers, as well as bandwidth, is implemented for each distinct domain or trust realm 112, 114, 116. Data traveling from one terminal within a trust realm to another terminal of such trust realm is never physically carried on or with data traveling between terminals of another trust realm. As a result, complete physical and logical separation of the domains or trust realms 112, 114, 116 is accomplished, and thus segregation of data is achieved.

Unfortunately, this approach leaves a lot to be desired in that it both requires redundancy of equipment and bandwidth, which, depending on the circumstances, can be a very significant disadvantage.

Figure 2:
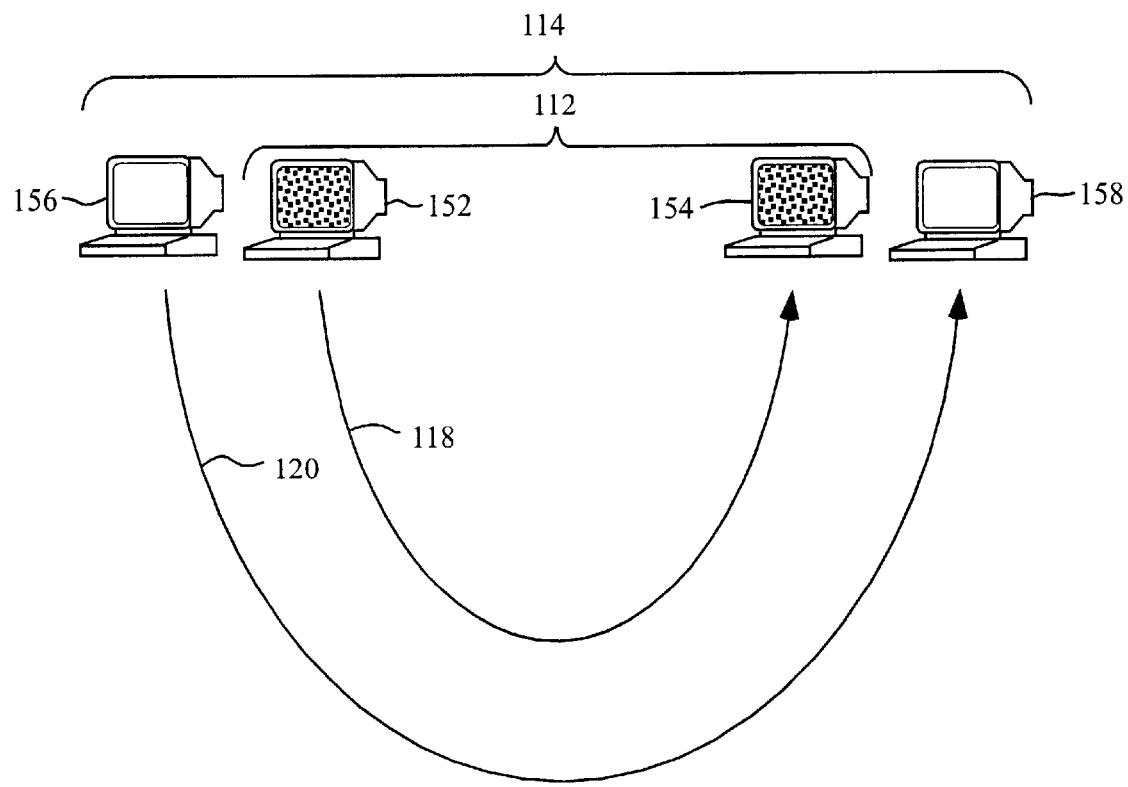
FIG. 2 is a simplified schematic representation further showing the traditional approach, as shown in FIG. 1, with a first data path or channel between terminals of a first domain or trust realm, and a second data path or channel between terminals of another domain or trust realm.

Referring next to FIG. 2, a simplified schematic representation further shows this traditional approach, as described above in reference to FIG. 1, with a first data path or channel 118 between terminals 152, 154 of a first domain or trust realm 112, and a second data path or channel 120 between terminals 156, 158 of another domain or trust realm 114.

Again, as will be appreciated by the skilled artisan, complete redundancy of both switches and routers, and of bandwidth is necessary to effect the design illustrated in FIGS. 1 and 2, thus creating an increased cost in terms of bandwidth, cabling, switches and routers over what an approach that shared these resources between domains or trust realms could cost. Unfortunately, heretofore known approaches that share these resources risk jeopardizing the segregation or separation of data, or unduly burden the network with processing overhead, such as with encryption technologies, and therefore are generally considered unacceptable.

By way of example, instead of physically separating data in physically separate channels, according to domain or trust realm, data can be encrypted at either end of a shared channel (e.g., within terminal, switches or routers) before transmission. Such systems strive to prevent decryption of the data by any terminals other than those terminals belonging to the same domain or trust realm as the terminal that is transmitting the data. Specifically, by having the necessary decryption keys only in terminals of a transmitting terminal's domain, other terminals, not of such domain, are theoretically prevented from decrypting data from terminals of such trust realm.

Advantageously, and unlike the approach illustrated in FIGS. 1 and 2, encryption of data eliminates the need for redundant switches and/or routers and eliminates the need for redundant bandwidth, However, a significant additional amount of processing overhead is required at either end of the transmission, e.g., within the terminals, switches or routers on either side of a shared channel, in order to perform the encryption and decryption of data. As a result, a significant loss of effective bandwidth is observed due to the delays introduced by this processing overhead, thereby significantly decreasing throughput obtainable by an encryption-based system. As a result, heretofore, the first traditional alternative described above, wherein redundant channels and accompanying hardware are employed, has been preferred. (This, of course, assumes that physical security over the channels and hardware can be maintained, which is also an assumption made in the preferred design described below. Where the channels and accompanying hardware cannot be physically secured, encryption remains a viable alternative for securing data of various domains or trust realms.)

The approach described below, in accordance with one embodiment of the invention claimed in the appurtenant claims, employs commercial off-the-shelf (COTS) equipment and software to construct a segregated multi-domain or multi-trust realm network. The COTS equipment and software are employed in ways and in quantities not envisioned by their manufacturers, e.g., multiple routers are used per network, whereas only a single router, or a primary router and a backup router, such as would typically be used in a single network. And, the COTS equipment and software are employed in a fashion not envisioned by their designers. Features built into the COTS equipment and software are used in concert (with one device or program complimenting a next device or program in a series). The use of both physically separate networks and the use of encryption are eschewed in the illustrated embodiment, due to their high demand for resources, and, in the case of encryption, poor performance relative to systems not employing encryption.

Figure 3:
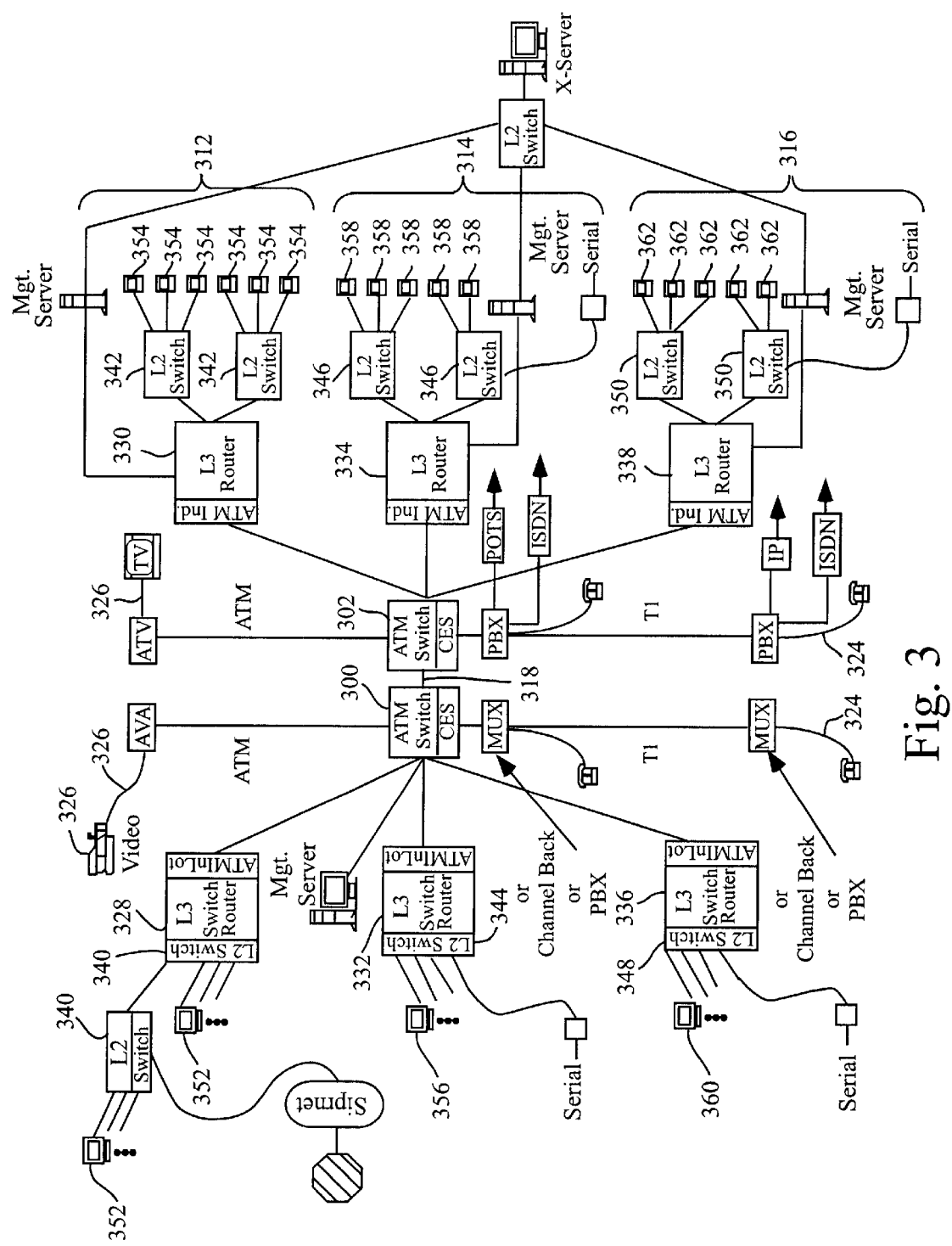
FIG. 3 is a block diagram showing an exemplary architecture for a network having multiple domains or trust realms, and communicating over a single common channel.

Referring next to FIG. 3, a block diagram showing an exemplary architecture for a network having multiple domains or trust realms 312, 314, 316, and communicating over a single common channel 318, is illustrated. At either end of the single common channel 318, one of a pair of asynchronous transfer mode (ATM) switches 300, 302 are employed, along with video and audio equipment 324, 326, on which shared information travels. As will be appreciated by one of ordinary skill in this art, the use of two ATM switches is a minimum, meaning that more than two ATM switches could be used consistent with the teachings of the present embodiment. This aspect is further discussed below. Coupled to each of the ATM switches 300, 302 is a plurality of, in this case three (i.e., in this case, a total of six), Layer three routers 328, 330, 332, 334, 336, 338, each of which is coupled respectively through a layer two switch (Ethernet switch) 340, 342, 344, 346, 348, 350 to one or more network interface cards. The network interface cards are, in turn, coupled to respective terminals.

As mentioned above, while only a pair of ATM switches is depicted, it is important to note that a number of ATM switches may be used in a ring or "cloud" configuration with various levels of inter-connectivity, each carrying multiple domains or trust realms of data. Two ATM switches were selected for illustration purposes.

The use of multiple ATM switches is solely to service additional areas within a zone of control, i.e., network, and to increase fault tolerance, not, in the present embodiment, to physically segregate data belonging to various domains or trust realms.

The layer three routers are used unconventionally in that rather than acting solely as directors of user packet data, the routers apply filters to ensure only packets intended for a particular domain or trust realm are transmitted within that domain. Each domain or trust realm is defined by a block of IP addresses or a subnet, as well as particular MAC addresses (Ethernet addresses) and an associated set of filters that segregate all data flow within that domain.

The layer three devices and the layer two devices may be individual distinct devices, but may be housed in a single chassis. If, however, they are combined in a single chassis, it is preferred that they are independent in their processing of data such that the failure of a single device, e.g., a processor failure, cannot cause a failure in performance of the other. In the even a shared processor is used, additional levels of filtering or other security enhancements may be needed to overcome the risks involved in employing a single processor. Independence between the processors (orthogonality) is thus desired, in accordance with the present embodiment, to ensure that data of one domain or trust realm does not pass into devices of another domain or trust realm, even in the event of a device or software failure, e.g., the failure of a single device to properly perform its filtering functions.

Figure 4:
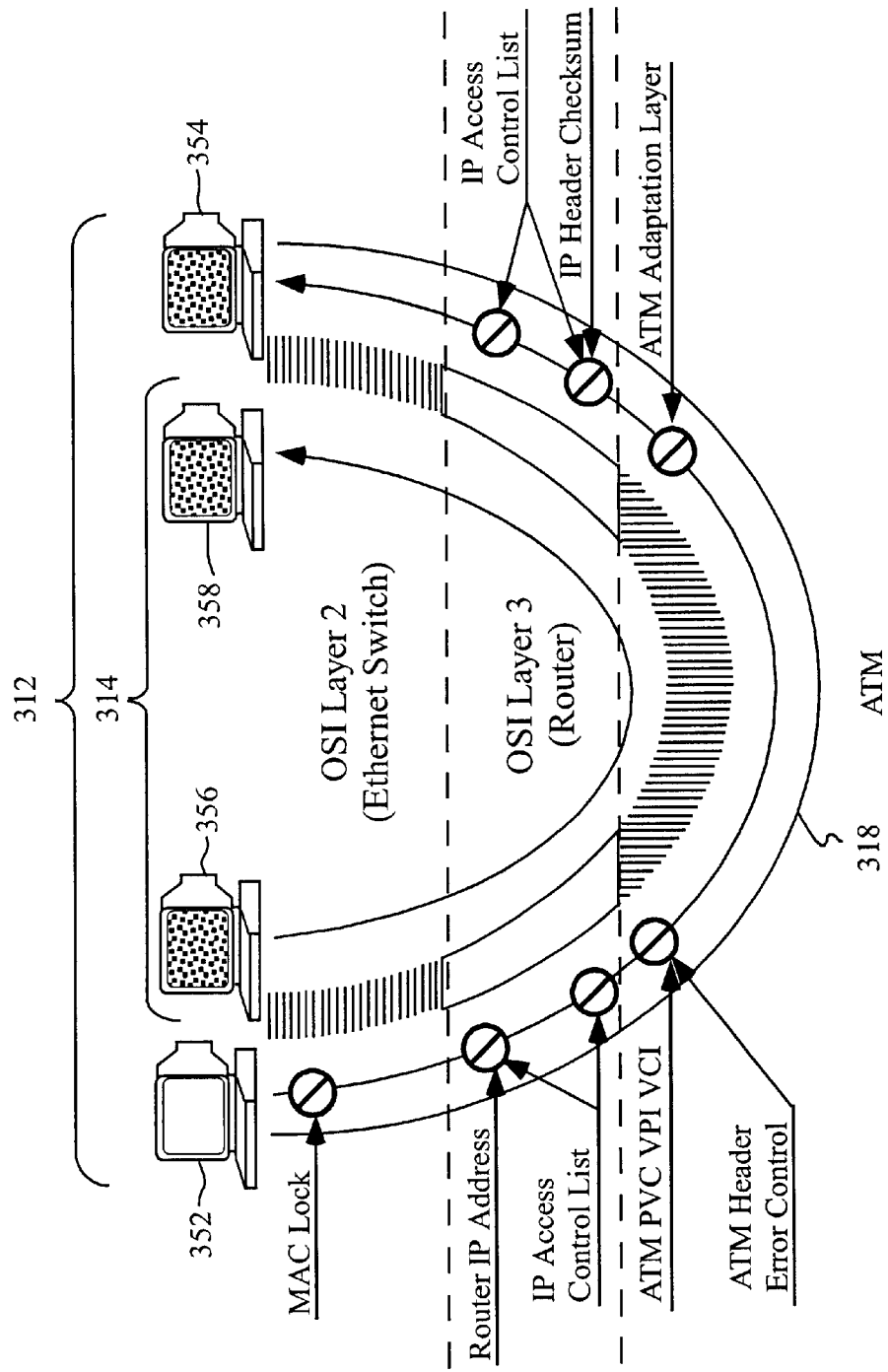
FIG. 4 is a schematic representation of a plurality of terminals linked by a network, such as in FIG. 3, wherein a single shared pair of ATM switches links terminals through a single channel, while at the same time maintaining segregation between data traveling in each of the domains or trust realms.

Referring next to FIG. 4, a schematic representation is shown of a plurality of terminals linked by a network, such as in FIG. 3, wherein a single shared pair of ATM switches links terminals through a single channel, while at the same time maintaining a logical separation between data traveling in each of the domains or trust realms. Data of all domains or trust realms is "physically" commingled within the shared or common channel but logical separation is maintained, such that only terminals that are members of a particular domain are able to receive or transmit data within such domain, i.e., to other terminals within such domain, even in the event a particular device or program fails to perform its filtering function as configured. This implies that, in the present embodiment, a minimum of two filters are required in any transmission path that includes the common channel. Immediate repair will be required of any failed device that normally provides a filter. For this reason, more than two filters are often employed sequentially in every data path, e.g., in the embodiment shown, five filters are shown in each data path.

As can be seen, filtering is performed at various layers, i.e., at various devices, switches and routers, within the system such that data passing from one terminal to another via the common channel must pass through a plurality of filters. Each selected component of the system is configured to function in support of a security scheme, such as set forth by way of example in Table 1. Each implementation or embodiment of the present security scheme, using COTS filters, is partially driven by end user models, with parameters varying slightly depending on vendor and models chosen for the various components of the system, including the layer two switches, the layer three routers, and the ATM switches. Of particular interest, however, are any filters that introduce latency or time delays as information traverses each device, and any filters that are considered to be unreliable, e.g., due to design flaws.

TABLE 1

| DEVICE | COTS FILTER |
| --- | --- |
| Terminal Device (Workstation, Server, etc.) | Format application data Apply IP address Apply MAC address |
| Ethernet Switch | Filter on MAC address (MAC lock) |
| Router | Filter on IP (source and destination) addresses Filter on socket number (IP access control list) |
| ATM Switch | Filter on MAC (router) address Filter on AAL type Filter on ATM header error control apply PVC |
| Router | Filter on MAC (ATM) address Filter on IP (source and destination) addresses Filter on IP header checksum Filter on socket number (IP access control list) |
| Ethernet Switch Terminal Device | Filter on MAC address Filter on MAC address Filter on IP address Filter on application data format |

With all data concerning the needs of a particular implementation available, i.e., what are the end user's requirements, e.g., network architecture, bandwidth, speed/performance, external connections, and degree of security, a process to determine optimal design can be undertaken. A first pass through the process is to determine a central network characteristic (number of security domains, how many times physical boundaries must be crossed, how connectivity beyond boundaries must be provided (i.e., whether and where encryption must be employed), and how personnel must be employed to best compliment the network design). Unique end-user requirements that may affect network design or information transfer are carefully considered. This process is normal; however, the process is conducted with a particular focus on those networking elements that are manifest in a distribution system that has been collapsed into a single backbone, i.e., that employs a common channel to carry data from multiple domains or trust realms.

A second pass involves refinement by modeling required and optimal data transport rates, expected gross capacity and other limiting factors of a particular end user. The model is also used at this stage to analyze the number of filters selected for use and the impact these filters will have on the flow of information across the network. This modeling technique uses Commercial-Off-The-Shelf (COTS) software, such as OpNet from Mil 3 of Washington, D.C., and standard techniques.

A third pass adds specific configuration information defining hardware and software elements collected for possible inclusion. Those specific parameters or "filters" determined necessary (e.g., MAC locking, flow control, IP address filtering, protocol conversion, etc.) are added to the model to ensure network devices can fully satisfy the end-user's operational and security demands. Operational demands include bandwidth, packet throughput, and network latency. The model is then exercised to simulate device failure to further test performance in a degraded environment.

Each modeling pass is evaluated to ensure that operational parameters are not violated and that security is not compromised. Examples of operational tests include broken fiber optic links, failed network devices, and network management outages.

The balancing of operational and security considerations is an important feature of the present embodiment. Application of security techniques always degrades the performance of a host system. For example, the use of an encryptor to protect a voice signal will result in a loss of 3 db (half power) at the input to a radio. In the case of the present embodiment, use of filtering techniques will add latency (increased transport time, i.e., decreased speed/performance) for each packet placed on the backbone (although not to the degree to which an encryptor adds to latency). The present design technique seeks to minimize latency while ensuring that a requisite level of security is maintained for the end-user. Note that the standard for security is most stringent in Government applications. Without this unique activity, as an integral part of design, delivery of a single channel or backbone transporting multiple levels, domains or trust realms of information, that meets operational/performance standards, would be difficult or impossible. Unlike the "separate networks" approach, described above, the present embodiment incorporates multiple domains of information on a single distribution system, and therefore must consider this balance using commercial "filters."

Thus, in accordance with the present embodiment, "normal" engineering analysis tools are used in a completely different way. The focus of the present approach is on efficient use of resources (bandwidth) rather than concentrating solely on security devices (and thus wasting bandwidth and adding much more equipment to the final design).

In implementing a network in accordance with the present embodiment, network engineers must have detailed knowledge of a desired minimum level of network performance, as well as the criteria required to gain security approval, i.e., a minimum tolerable security level. Then, using a commercial modeling tool, such as OpNet, mentioned above, these minimum performance and security parameters are loaded along with the descriptions of qualified commercial devices. Network topologies are investigated with respect to size and configuration to optimize performance. Security filter layers are properly installed to ensure standards of separation are maintained appropriate for Government or commercial applications.

Figure 5:
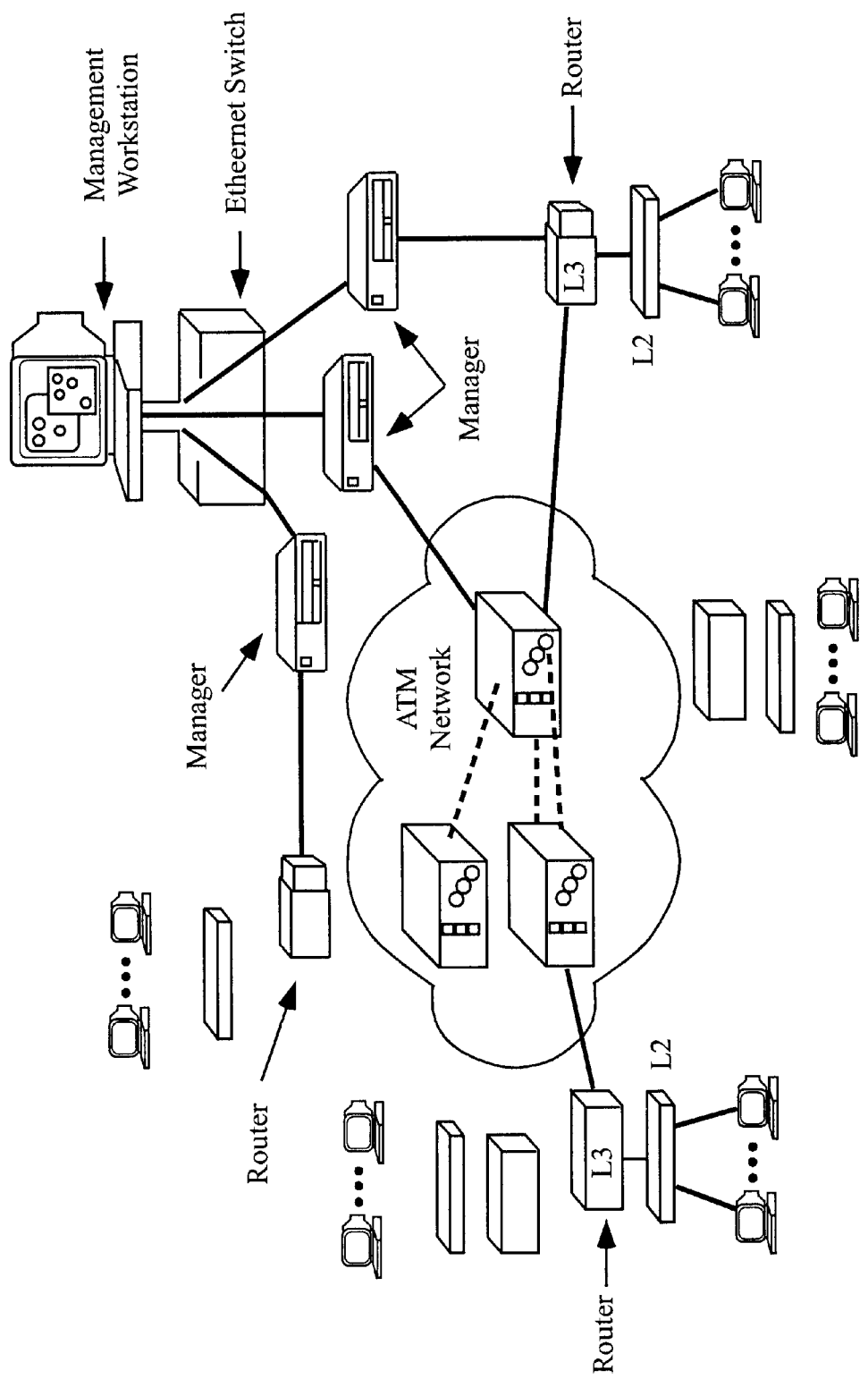
FIG. 5 is a schematic illustration of a single workstation for managing the system of FIGS. 3 and 4 wherein each domain or trust realm is connected to a single processor (or "manager"), which is in turn coupled to the single workstation.

After a proposed design is achieved, the proposed design is emulated using a relatively small number of selected pieces of equipment and software. Filters in each COTS device are configured, activated and tested to ensure the proposed system functions as designed above. In accordance with the present approach, this testing is performed in a laboratory by connecting a representative set of hardware and software. The basic test is one of building a single set of end-to-end hardware, with network management being added to verify that control and monitoring of the system is properly configured. The remainder of the proposed system is then added one section at a time to ensure the proposed system is coherent. Finally, testing of specific interfaces necessary to connect the system with external networks is performed. This includes adding hardware interfaces to long-haul communications systems such as the Internet Protocol networks, telephone lines, high-speed data lines, and/or satellite communications circuits. Interface devices are identified, tested and employed to demonstrate operational effectiveness and sufficiency of security. Each of these interfaces is tested with regard to commercial or military interface standards, voice clarity, latency limits, or other parameters important to the specific end-user application. Once these design and testing steps are performed, system management functions are added to the design. A single workstation is all that is required to manage the entire system. Each domain or trust realm is connected to a single processor ("manager") as shown in FIG. 5. A router for each domain is configured with an Access Control List (ACL) firewall that allows only simple network management protocol (SNMP) packets to pass between the router and the manager. The manager is loaded with a commercial firewall, such as, for example, the firewall software marketed under the name Gauntlet, by Network Associates of Santa Clara, Calif., or such as the firewall software marketed under the name Check Point FireWall-1 by Check Point Software of Ramat-Gan, Israel (U.S. Headquarters in Redwood City, Calif.) and with network management software, such as, for example, the management software marketed at Spectrum by Cabletron Systems of Rochester, N.H. The firewall acts as a secondary filter to block all but Simple Network Management Protocol (SNMP) traffic between the router and the manager.

Similarly, the ATM switches themselves are connected to an independent processor ("manager"), a separate manager being employed to guarantee that no member of any one security domain can accidentally alter the configuration of the ATM switches. An Ethernet switch is placed between the managers and the single workstation used to manage the system (management workstation). The Ethernet switch is configured to ensure connections cannot be made between any two network side ports.

The management workstation is, itself, not loaded with management software, but rather, for example, an X-protocol session is established between the management workstation and each manager to offer multiple sessions, each for the routers and switches of a different domain and one session for management of the ATM switches, which are shared by all domains. In lieu of the X-protocol session, virtually any remote control or communications protocol or software can be configured to serve the functions described herein. (Each of the managers, on the other hand, is loaded with the management software, such as is mentioned above.) This approach minimizes loading of the system with management data, while offering the possibility of managing up to, for example, 254 separate domains or trust realms from a single management workstation. Multiple management workstations may also be employed in order increase security, such as, for example, by requiring that two "managers" approve changes to the network. Or, as explained below, "managers" may have access to only a few of the devices necessary to implement security in the network.

When basic operation of system components are verified (developed, tested and retested), security configuration files, which are stored on the management workstation, are loaded into each COTS device in order to configure the filters and operational parameters necessary to implement the design. A network management capability is activated and configured to guarantee proper operation of the system and full control of all required security aspects. A commercial network management software product, such as OpNet, is installed on each manager computer and configured to monitor and allow modifications to the operational parameters of the switches and routers in its security realm.

Administrator accounts are configured such that there is a division of responsibilities across filtering devices. For example, an individual "manager" can reconfigure routers but not switches—a different "manager" may have privileges appropriate for switch reconfiguration but not router parameters.

Figure 6:
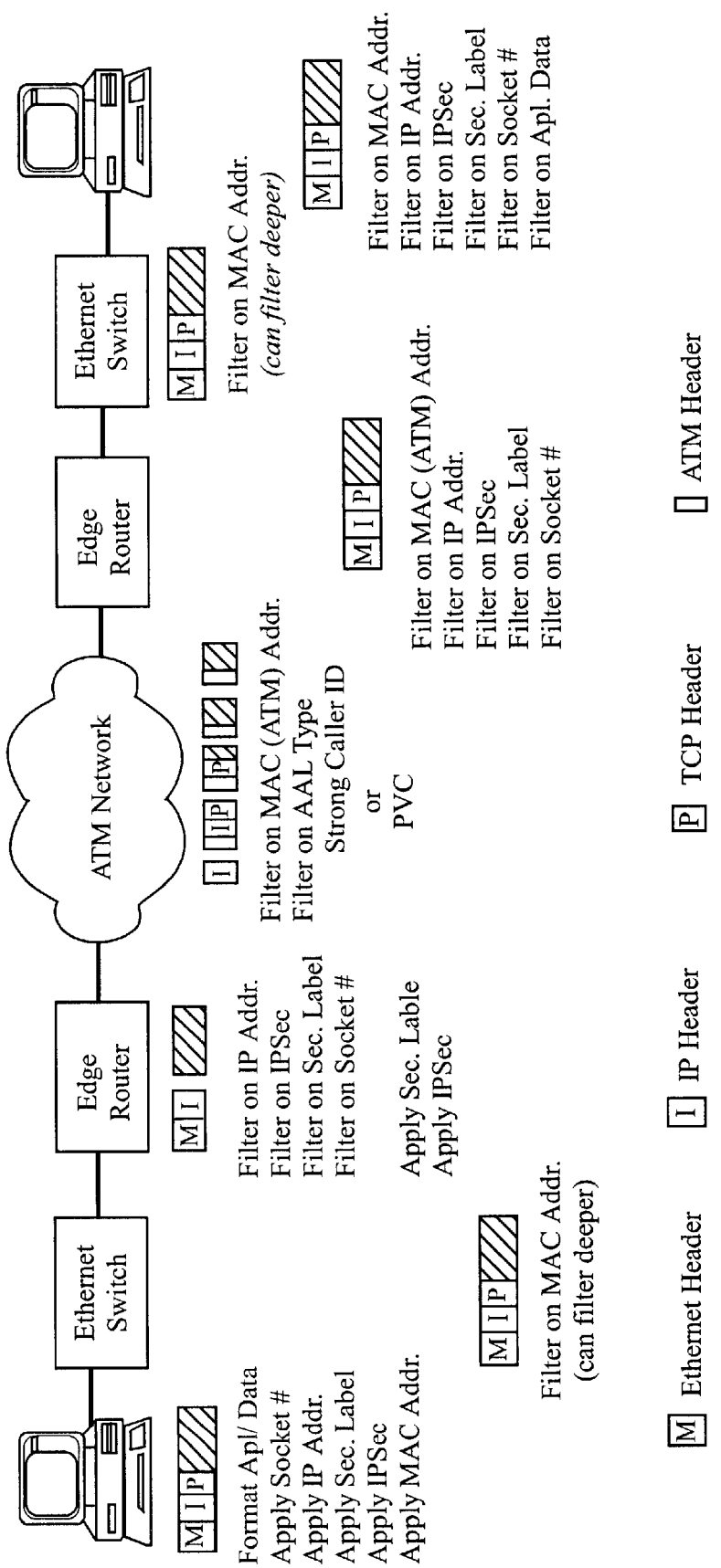
FIG. 6 is a pictorial diagram of various components of the system of FIG'S. 3 and 4, and including filter criteria available at each level of the system (as designed), i.e., at each router and switch.

Referring next to FIG. 6, a pictorial diagram is shown of various components of the present system, and including filter criteria available at each level of the system (as designed), i.e., at each router and switch.

Amongst these possible filtering options, an optimal set of filtering criteria has been developed by the inventors for the design illustrated herein. In any given implementation, however, one or more modifications to this criteria could result in improved security and/or performance. Thus, the design methodology described above may yield differing results as a function of the particular network design demanded by a particular end-user's networking needs.

Figure 7:
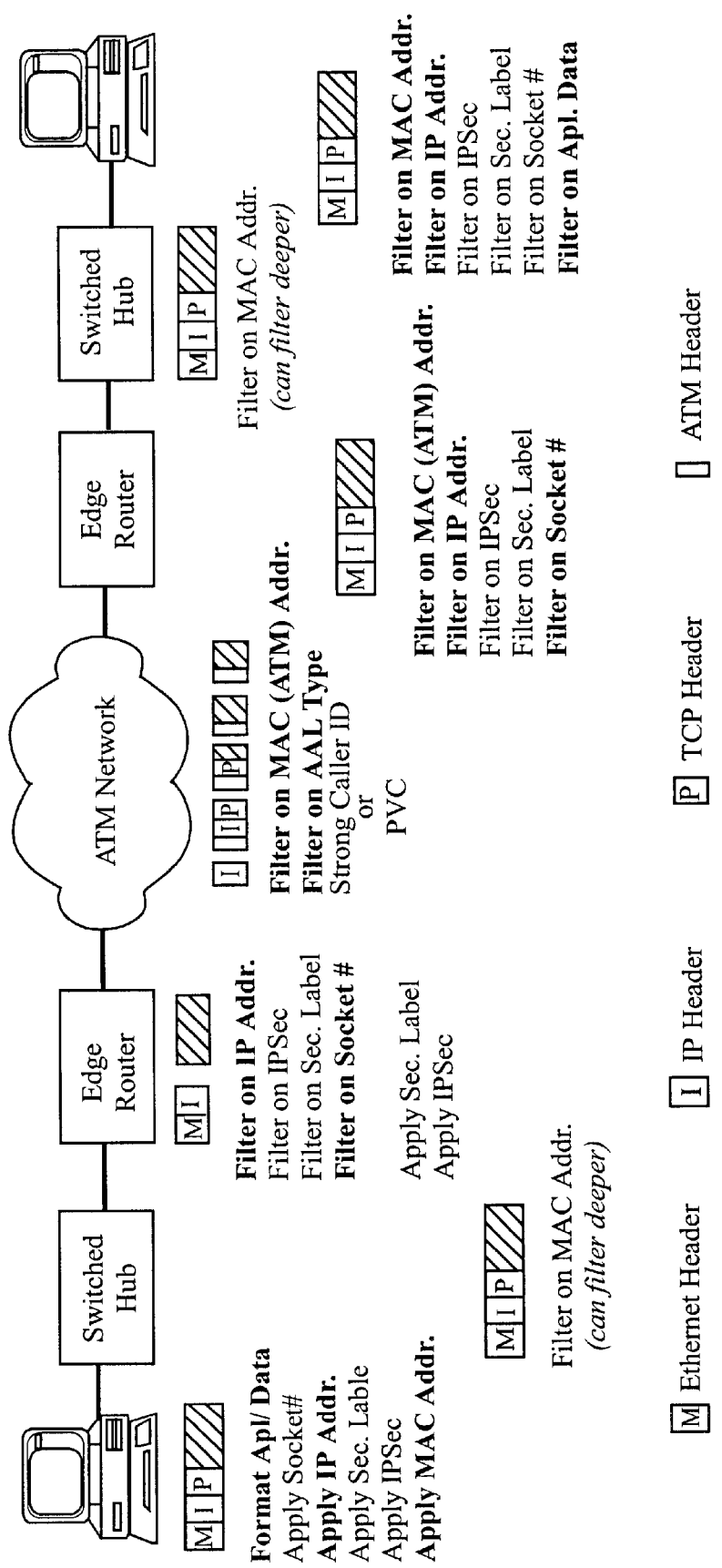
FIG. 7 is a pictorial diagram similar to that of FIG. 6 with selected filtering criteria shown in bold type, and with unused filtering criteria shown in normal type.

Referring next to FIG. 7, a pictorial diagram similar to that of FIG. 6 is shown with selected filtering criteria shown in bold type, and with unused filtering criteria shown in normal type. These selection types correspond to those highlighted above and listed in TABLE 1, as selected during the above-described design process.

In operation of the design illustrated, as packets are formulated at a sending terminal, application data is formatted and IP address and a MAC address is applied, i.e., an IP address and a MAC address is added to each packet. At the layer two switch, filtering is performed based on the MAC address and any packets carrying unauthorized MAC addresses are blocked from further transmission beyond the layer two switch. Specifically, the MAC address portion of each packet's header is examined, and only those packets containing MAC addresses authorized to transmit through the layer two switch are passed to the layer three router. A packet that is determined to contain incorrect MAC information within it will cause the associated port on the layer two switch to cease all operation, blocking all subsequent traffic, and send a "trap" alarm to the network manager to indicate that a breach of layer two security was detected. The packet itself cannot continue along any network path and is discarded at the switch. Further, this port will remain inoperative until re-enabled by an authorized network manager. Within the layer three router, filtering is performed based on source and destination IP address. Thus, within the layer three router, the IP address portion of each packet header is examined, and packets carrying IP addresses that are not authorized to transmit through the layer three router are discarded, i.e., blocked. Further, filtering is performed based on socket number at the layer three router, and only packets directed to authorized socket numbers are passed through the layer three router. Both IP and socket filters are controlled by reference to Access Control Lists (ACLs) against which the header information of each packet is compared. When a match is found, the packet is either forwarded or discarded based on the instructions written in the ACL.

Assuming a packet passes through the filters of the layer two switch and the layer three router, this packet then travels through the layer three router to a first ATM switch and filtering is performed on AAL type and PVC. AAL-1 is formatted to accommodate constant bit-rate information such as voice or video. AAL-5 is formatted to transport variable bit-rate information such as Ethernet packets. These basic differences in format provide a natural method to separate a few domains of information from each other. PVCs are designed to provide reliable connections between endpoints on a network. They are separated by means of a path and channel number with each PVC on each physical link having a unique identifier. As data exits the ATM network through a second ATM switch the ATM cells are checked for integrity prior to being transmitted to the next device in line—another layer three router. Filtering is performed by the layer three router on the IP address, IP header checksum, and socket number at the layer three router. This process is the reverse of that performed when the information was applied to the network, with the addition of an additional integrity check (the IP header checksum). At the layer two switch on the receiving terminal side, filtering is performed on the MAC address. And, within the receiving terminal, filtering is performed on the MAC address, the IP address and on the application data. Again this is the reverse of the process performed as information entered the first network device, with the addition of filtering on the application data. Applications have their own set of protocols that are peculiar to the vendor. Information appropriate to a video application, for example, will be rejected or discarded if received by a electronic mail application.

While the invention herein disclosed has been described by means of specific embodiments and applications thereof, numerous modifications and variations could be made thereto by those skilled in the art without departing from the scope of the invention set forth in the claims.

What is claimed is:

1. A system for transporting data comprising;

a common channel carrying data of a plurality of domains;

a first switch through which data enters the common channel;

a second switch through which data exits the common channel;

first filter means for filtering data traveling between the first switch and the second switch based on a first filtering criteria;

a first set of routers coupled to the first switch, each router being for a respective one of the plurality of domains;

second filter means for filtering data traveling through each of the first set of routers based on a second filtering criteria, the second filtering criteria being different from the first filtering criteria;

a second set of routers coupled to the second switch, each router being for a respective another of the plurality of domains;

third filter means for filtering data traveling through each of the second set of routers based on a third filtering criteria, the third filtering criteria being different from the first filtering criteria;

a first terminal coupled to one of the first set of routers and being of a first of the plurality of domains;

a second terminal coupled to one of the second set of routers and being of the first of the plurality of domains, wherein data transmitted by the first terminal passes through the one of the first set of routers to the first switch, through the first switch to the common channel, through the common channel to the second switch, through the second switch to the one of the second set of routers, and through the one of the second set of routers to the second terminal;

a third terminal coupled to another of the first set of routers and being of a second of the plurality of domains; and a fourth terminal coupled to another of the second set of routers and being of a second of the plurality of domains, wherein data transmitted by the third terminal passes through the other of the first set of routers to the first switch, through the first switch to the common channel, through the common channel to the second switch, through the second switch to the other of the second set of routers, and through the other of the second set of routers to the fourth terminal, the first filter means, the second filter means and the third filter means preventing data transmitted by the first terminal from reaching the third terminal and the fourth terminal.

2. The system of claim 1 wherein said first filter means includes means for filtering based on an IP number.

3. The system of claim 1 wherein said first filter means includes means for filtering based on a MAC address.

4. The system of claim 1 further comprising:

third filter means for filtering data traveling through each of the first set of routers based on a third filtering criteria, the third filtering criteria being different from the first filtering criteria and the second filtering criteria.

5. The system of claim 1 wherein said third filter means includes means for filtering based on an error control.

6. A method of constructing a system for transporting data comprising:

providing a common channel for carrying data of a plurality of domains;

coupling a first switch to the common channel through which data enters the common channel;

coupling a second switch to the common channel through which data exits the common channel;

defining a first filter for filtering data traveling between the first switch and the second switch based on a first filtering criteria;

coupling a first set of routers to the first switch, each router being for a respective one of the plurality of domains;

defining a second filter for filtering data traveling through each of the first set of routers based on a second filtering criteria, the second filtering criteria being different from the first filtering criteria;

coupling a second set of routers to the second switch, each router being for a respective another of the plurality of domains;

defining third filter for filtering data traveling through each of the second set of routers based on a third filtering criteria, the third filtering criteria being different from the first filtering criteria;

coupling a first terminal to one of the first set of routers, the first terminal being of a first of the plurality of domains;

coupling a second terminal to one of the second set of routers, the second terminal being of the first of the plurality of domains, wherein data transmitted by the first terminal passes through the one of the first set of routers to the first switch, through the first switch to the common channel, through the common channel to the second switch, through the second switch to the one of the second set of routers, and through the one of the second set of routers to the second terminal;

coupling a third terminal to another of the first set of routers, the third terminal and being of a second of the plurality of domains; and coupling a fourth terminal to another of the second set of routers, the fourth terminal being of a second of the plurality of domains, wherein data transmitted by the third terminal passes through the other of the first set of routers to the first switch, through the first switch to the common channel, through the common channel to the second switch, through the second switch to the other of the second set of routers, and through the other of the second set of routers to the fourth terminal, the first filter means, the second filter means and the third filter means preventing data transmitted by the first terminal from reaching the third terminal and the forth terminal.

7. The method of claim 6 wherein said defining of said first filter includes defining a filter based on an IP number.

8. The system of claim 6 wherein said defining of said first filter includes defining a filter based on a MAC address.

9. The system of claim 6 further comprising:

defining a fourth filter for filtering data traveling through each of the first set of routers based on a fifth filtering criteria, the fourth filtering criteria being different from the first filtering criteria, the second filtering criteria, and the third filtering criteria.

10. The system of claim 6 wherein said defining of said third filter means includes defining a filter based on an error control.

* * * * *